United States Patent [19]

Hartzell

[11] Patent Number: 4,666,602
[45] Date of Patent: May 19, 1987

[54] MANURE SEPARATOR

[76] Inventor: Kirk Hartzell, E. 11317 24th, Spokane, Wash. 99206-5642

[21] Appl. No.: 728,925

[22] Filed: Apr. 30, 1985

[51] Int. Cl.$^4$ .................... B01D 33/20; B01D 36/02; B01D 23/20
[52] U.S. Cl. .................... 210/298; 210/386; 210/396; 210/402; 210/413; 100/110; 100/121; 198/728
[58] Field of Search ............... 210/325, 328, 413, 414, 210/396, 397, 402, 806, 298, 326, 407, 386; 100/110, 121; 209/358; 198/728, 733

[56] References Cited

U.S. PATENT DOCUMENTS

| | | | |
|---|---|---|---|
| 670,963 | 4/1901 | Logemann | 100/121 |
| 2,069,448 | 2/1937 | Ireland et al. | 210/402 |
| 2,768,734 | 10/1956 | Klinzing | 198/728 |
| 3,124,237 | 3/1964 | Schommer | 198/728 |
| 3,447,667 | 6/1969 | Patz et al. | 198/733 |
| 3,538,996 | 11/1970 | Ledoux | 198/733 |
| 3,705,547 | 12/1972 | Laurie et al. | 100/121 |
| 3,864,255 | 2/1975 | Swanson | 210/806 |
| 3,873,450 | 3/1975 | Lovegreen | 210/396 |
| 3,982,499 | 9/1976 | Frankl | 210/386 |
| 4,419,239 | 12/1983 | Frankl | 210/413 |

FOREIGN PATENT DOCUMENTS

| | | |
|---|---|---|
| 138764 | 11/1979 | German Democratic Rep. |
| 2104402 | 3/1983 | United Kingdom |
| 776628 | 11/1980 | U.S.S.R. |
| 899406 | 1/1982 | U.S.S.R. |

Primary Examiner—Richard V. Fisher
Assistant Examiner—Linda S. Evans
Attorney, Agent, or Firm—Wells, St. John & Roberts

[57] ABSTRACT

A manure separator arrangement is described including a flume and chain conveyor arrangement by which initially received slurry of liquids and solids is directed over a perforated flume floor. Liquid is allowed to drain through perforations in the floor as the slurry is moved along a pair of troughs formed along the flume. The entire flume is inclined so the liquids received from the perforated flume floor will drain downwardly away from the solids being carried along by the drag conveyor. Solids leaving a discharge end of the flume may lose approximately 80% of the liquid previously contained in the slurry or mixture. The manure discharged from the flume may be received by a separator press roll mechanism by which remaining moisture can be separated. The separator includes a rotated perforated drum and an oppositely rotated press roll. The press roll is yieldably urged against the rotating surface of the drum and is simultaneously rotated to press or squeeze liquid from the solids.

30 Claims, 5 Drawing Figures

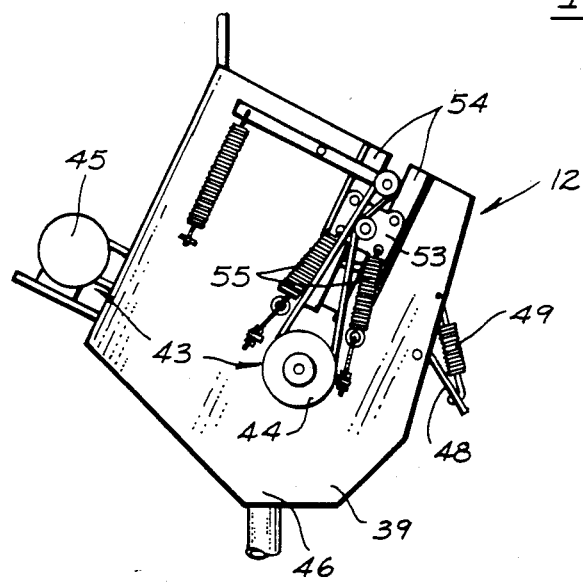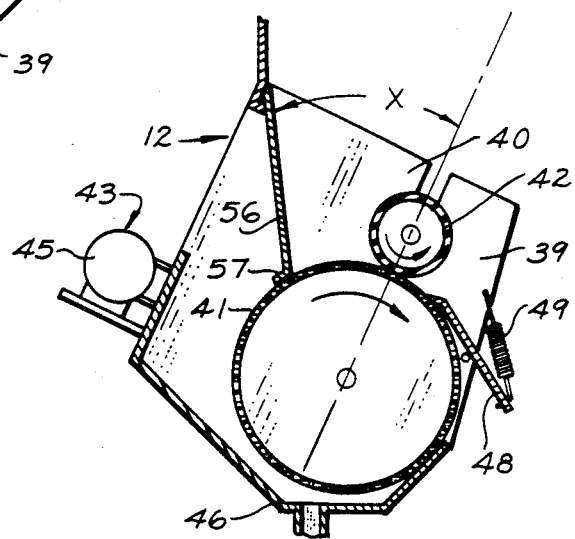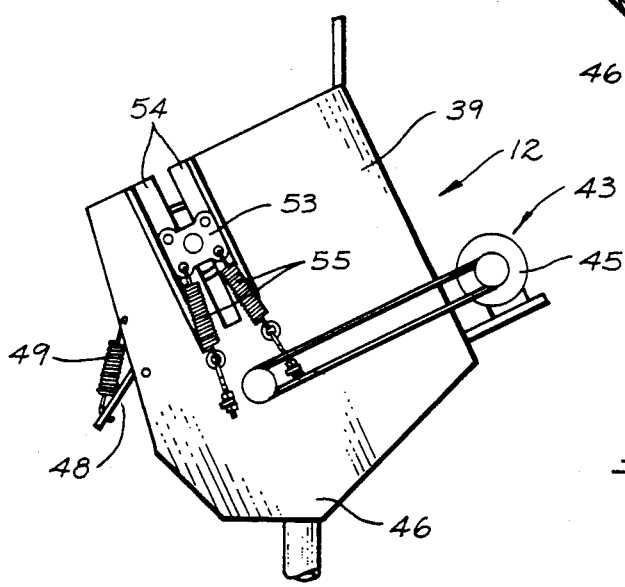

MANURE SEPARATOR

FIELD OF THE INVENTION

The present invention relates to separation of solids from liquids in manure handling systems.

BACKGROUND OF THE INVENTION

Most modern livestock handling facilities include a system by which waste liquids and solids are collected. A popular method of collecting waste and cleaning livestock holding areas such as a barn floor involves flushing the floor with water under pressure. The resulting slurry of water and waste is then directed to a holding tank or lagoon to await further processing. Removal of waste by this method is satisfactory. But equipment for separating the solids and liquids from the resulting slurry has not been adequately developed until the advent of the present invention.

The problem is recognized from the need to effect nearly complete separation of solids from liquids in situations where both liquids and solids are to be reused. The solids should be as dry as possible for future use as bedding or feed supplements. Known existing and past forms of separators will not separate the high percentage of liquids necessary to leave adequately dry solids, especially if the solids are to be recycled as a percentage of livestock feed.

An attempted solution to the separation problem is recognized in the Swanson et al U.S. Pat. No. 3,971,720. The Swanson patent discloses a method and apparatus for processing cattle excrement. The apparatus includes a series of press rolls for successively compacting the solids from a slurry to separate the liquids. The slurry is first received between a first pair of the rollers. One of the rollers is driven to move the liquids and solids between it and the remaining roller. The two rollers are sprung toward one another to press an initial amount of the liquid from the slurry. The partially separated solids and liquids contained therein are then dropped to another pair of rollers which perform the same function again. This process is repeated until the solids become sufficiently dry for reuse.

U.S. Pat. No. 3,950,562 to Senior discloses an apparatus for removing ash and inorganic compounds from cattle manure. This device makes use of an inclined conveyor having a series of longitudinally spaced baffles on its working flight that are powered to move toward the upper end of the conveyor. A slurry is discharged onto the working flight of the conveyor so the liquids will cascade over the baffles while the solids are carried upwardly to a discharge end of the conveyor.

U.S. Pat. No. 4,348,280 to Schipper discloses a device for removing liquids from solids. Press rolls are oriented along a flexible conveyor arrangement. A layer of the moist mixture can be progressively pressed between rotating drums and the operating surface of the conveyor belt.

U.S. Pat. No. 3,959,135 to Shattock discloses an apparatus somewhat similar to the Schipper device discussed above with the exception that the conveyor is driven along a stright longitudinal path between vertically opposed press rolls where in Schipper, the conveyor path is diverted to engage in greater circumferential area of contact between the waste material and drum surface.

U.S. Pat. No. 4,186,098 to Morris discloses an arrangement by which sludge is dewatered. A series of the opposing press rolls are situated along a perforated conveyor carrying sludge. The rolls are particularly shaped to maintain the liquid of the slurry along the center of the conveyor by forming the working flight of the conveyor into a trough configuration.

Even with provision of the above-described apparatus, there remains a need for a manure separating apparatus that will operate to efficiently and effectively reduce the moisture content of resulting dried solids in an efficient and economic manner.

BRIEF DESCRIPTION OF THE DRAWINGS

Preferred forms of the present invention are illustrated in the accompanying drawings in which:

FIG. 3 is a side elevation view of a separator press arrangement of the present invention;

FIG. 4 is a sectioned view through the separator; and

FIG. 5 is a side view opposite that shown in FIG. 3.

DETAILED DESCRIPTION OF THE PREFERRED EMBODIMENT

Figure 1:
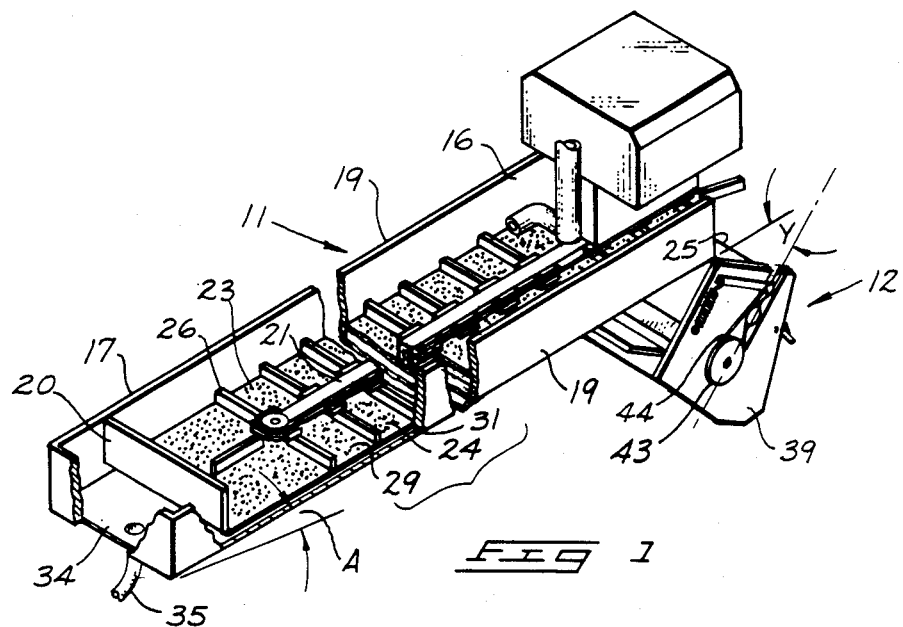
FIG. 1 is a fragmented pictorial view of a separator arrangement of the present invention.

In compliance with the constitutional purpose of the Patent Laws "to promote the progress of science and useful arts" (Article 1, Section 8), applicant submits the following disclosure of the invention.

The present invention is useful in livestock industries to receive animal waste usually carried in a slurry with water, to separate liquids from the solids within the waste. The liquids can then be used for further wash purposes or fertilizer. The solids can be sufficiently dried for further use, for example, as bedding.

In the dairy industry, cattle waste products are often collected in lagoons or tanks with water used to flush the waste from barn floors. Both liquid and solid wastes are collected, along with the flush water, in large storage tanks or storage lagoons. The water used is often recycled through to flush the barn floors several times before it becomes sufficiently enriched with nutrients from the solids and other waste products to warrant spreading as fertilizer over crop surfaces.

When reflushing or separation of the water from solids becomes necessary, the present apparatus can be utilized to effectively remove liquids from solids within the tank or lagoon. The liquid removed by the present apparatus can be recycled to the tank or lagoon. Or the liquid can be received by a conventional form of applicator or spreader mechanism currently being used for applying similarly treated liquids to the ground surface for fertilizing purposes. The solids discharged by the present apparatus can be used as desired. The dry wastes leaving the present apparatus are sufficiently dry to enable their use both as bedding or as a feed supplement.

The present invention was conceived as a solution to the rather unique problem associated with separating manure solids from liquids or, in effect, drying the manure solids. The drying process may be accomplished using a combination of a flume arrangement generally shown in the drawings at 11 and a separator press shown generally at 12. Both flume 11 and press 12 may be combined to separate and dry solids from a slurry.

Figure 2:
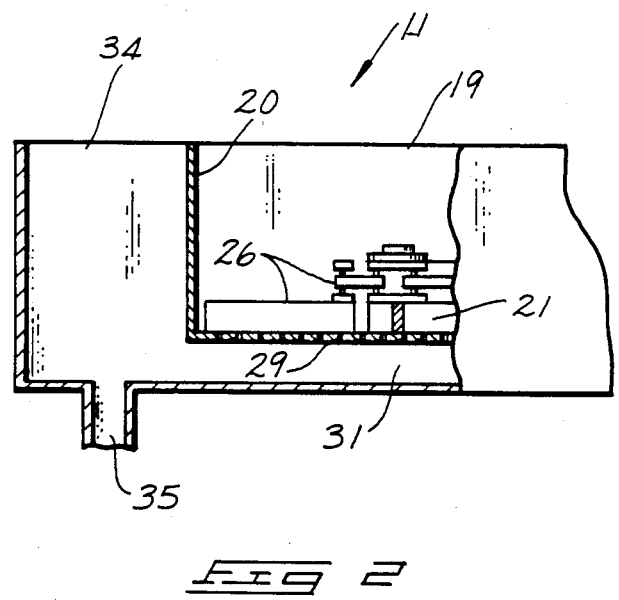
FIG. 2 is an enlarged fragmentary view illustrating an end of a flume for the present assembly and an associated surge tray.

Referring now in more detail to the drawings, the flume 11 is shown generally by FIG. 1 and more specifically in FIG. 2. The flume is elongated and may vary in length according to need. It includes an upper end 16 and a longitudinally disposed lower end 17. The flume is preferably inclined between the ends 16 and 17 through an angle "A" as indicated in FIG. 1 of at least 5°. This angle facilitates reception of a liquid-manure slurry along the length of the flume 11 to encourage gravitational flow from the upper end 16 toward the lower end 17. The slurry may be contained within the flume by means of upright longitudinal side walls 19 joined at the lower end 17 by an end wall 20.

The flume is divided along its length by an internal central divider 21. The divider 21 forms the interior of the flume 15 into two joined longitudinal troughs 23, 24. The trough 23 on one side of the flume receives slurry from an infeed source. The slurry will run gravitationally down the adjacent trough toward the lower flume end 17.

The lower end of trough 23 is open to the remaining trough 24 which extends upwardly from the bottom or lower flume end 17 to a discharge 25. The slurry is not assisted by gravity in moving upwardly from the lower end 17 toward the discharge 25 so means is provided in the form of a driven paddle chain 26 to engage and forceably move the slurry along the length of the trough to the discharge 25. The paddle drag chain 26 may be moved continuously through both troughs 23, 24. In the trough 23 adjacent the infeed, the paddles will be driven to move in a downward direction. The chain then turns at the lower end of the flume and progresses upwardly along the second trough 24. Solids and liquids still engaged by the paddles at this point will be carried upwardly from the lower flume end to the dicharge 25. The paddle drag chain may be operated at a speed of approximately 17 feet per minute.

The drag chain conveyor and its associated drive mechanisms can be selected from commercially available drag chain mechanisms currently used in clean-out systems for livestock holding facilities. The chain, paddles, and drive mechanisms are specially suited to handling of livestock waste and function very well in conjunction with the present flume and trough arrangement as described.

Drying is accomplished throughout the movement of a received slurry on the flume by interaction between the slurry and a perforated flume floor 29. It is preferable that the flume floor 29 be provided with equally spaced openings totalling approximately 35% of the entire flume floor. Therefore, as the slurry moves along the troughs, liquid is allowed to drain through the perforated flume floor.

A collector 31 is provided beneath the perforated flume floor 29 to function as means for collecting the separated liquid. The collector 31 may be an integral part of the flume, comprising a solid floor structure arranged below the perforated flume floor to catch and direct liquids downwardly along the flume length to a surge tray 34 (FIG. 2).

The surge tray 34 is used to receive liquids from the collector and to provide a temporary receptacle in order to avoid pooling of liquids along the lower ends of the two troughs. A discharge 35 is provided in the bottom of the tray to drain received liquids. Appropriate hoses or pipes (not shown) can be connected to the discharge to receive and direct the liquids as desired.

In operation, a slurry of liquid and solids is fed into the present flume 11 through an appropriate infeed. The infeed pipe is preferably positioned to discharge slurry into the trough 23 at the upper flume end 16. Liquids from the received slurry will immediately begin to flow gravitationally toward the lower flume end 17 due to the 5° flume incline. Movement of the solids will be assisted in this direction by constant motion of the paddle drag chain 26. The paddles continuously move down the trough 23, around the lower or bottom end of the central divider 21, and back up the remaining trough 24 to the discharge 25. As the liquids and solids move along, a large percentage of the liquids will be strained through the perforated conveyor floor. They drain through the perforations to the collector, down the collector to the surge tray 34 and finally out through the discharge 35. The drag chain continues moving the solids along, allowing them to tumble or scrape along the perforated flume surface and gradually lose the liquids as they move down the first trough 23 and subsequently up along the adjacent trough 24.

The solids become progressively drier as they move along the two troughs 23, 24 of the present flume. In fact, the solids in many cases have been found to have lost approximately 80% of the slurry moisture by the time they reach the discharge 25.

The remaining moisture still contained within the solids can be substantially removed by provision of the separator 12 as shown in substantial detail in FIGS. 3 through 5. The separator, as briefly indicated above, can be supplied as an integral portion of the flume and separator arrangement shown in FIG. 1.

The separator press 12 can be provided at the flume discharge 25 for receiving the partially dried solids. The separator press 12 functions to continue the separation process of solids and liquids to a point where the discharged solids are dry enough to be used as bedding or feed supplements.

The separator press 12 includes a supportive housing 39 that may, as shown in FIG. 1, be suspended from the discharge end of the flume 11. The housing 39 is furnished with an upwardly open hopper 40 for receiving partially dried manure. The received material is moved from the hopper 40 by a rotating drum 41 and a press roll 42 where liquids are forcefully squeezed from the solids.

The surface of the drum 41 may be perforated so the removed liquids can be discharged through the center of the drum and collected. It is preferred that the drum be formed of a rigid sheet material such as stainless steel with integral perforations formed therein as opposed to a screen surface. It is also preferred that the perforations extending over the drum surface be uniformly spaced and occupy approximately 32% of the drum surface.

The drum surface perforations allow passage of liquid from the solids being pressed between the drum 41 and press roll 42. Separated liquids will drop through the perforations at the bottom of the drum to be collected within a drain tray 46 formed integrally with the housing 39. The drain tray 46 can be connected to the drain or discharge 35 for the flume 11, or can be directed elsewhere by appropriate pipes or hoses.

The surface of the press roll is furnished with a resilient material, preferably vulcanized rubber having durometer of between 45 and 50. This surface is provided to deflect upon engagement with any excessively hard objects that could otherwise damage the perforated drum surface. The exterior surface of the press roll may be smooth and cylindrical.

The drum 41 and press roll 42 are powered to rotate by a drive means 43. Means 43 is operated to rotate both drum 41 and press roll 42 simultaneously and in opposite directions as indicated by the arrows in FIG. 4. This is accomplished by a sprocket and chain assembly 44 indicated in FIG. 3 interconnecting the drum and press roll 41, 42. Assembly 44 transmits driving forces from the drum 41 to the press roll 42. A motor drive assembly 45 is provided on the one side of the housing and is connected to the drum to provide initial rotating force. Thus, the motor 45 drives the drum 41 to rotate in a clockwise direction as indicated in FIG. 4. The chain and sprocket arrangement 44 operates on opposite sides of the housing to transmit rotational motion of the drum to counter clockwise rotation of the press roll 42.

The sprocket ratios in the chain and sprocket arrangement 44 are similar to the ratio of diameters between the drum and press roll. The engaged cylindrical surfaces of the drum and roll will thus rotate at the same speed and will not scuff or slide over one another.

It is preferred that the drum and press roll be operated within a range of 17 to 26 rpm. A rotational speed of approximately 18 rpm is preferred when the speed of the drag chain conveyor is at 17 feet per minute. Operational capacity of the separator is thereby set to match that of the flume. The driving arrangement for the press roll and drum is important for effective operation of the present separator. Both rotating cylindrical surfaces (of the drum 41 and press roll 42) are used for guiding and urging solid materials from the hopper 40 between their converging cylindrical surfaces. Both rotating surfaces thus provide traction against the received material to encourage movement between the oppositely rotating surfaces.

Other forms of press type separators make use of single driven drums and "idler" press rolls. These are only partially effective since the material passing between the drum and roll is often slippery. Occasionally the non-driven roll will not rotate and simply scuff or skid along over the relatively slick surfaces. This causes accumulation of material on the stationary drum surface and, if left unattended, can affect the resulting performance of the separator. Such "scuffing" can also cause excessive and non-uniform wear of the roll surface.

It is important to note the ratio of diameters between the drum 41 and press roll 42. It is preferred that the press roll diameter be equal to approximately 40% that of the drum 41. A preferred drum diameter of approximately 14 inches therefore determines a press roll diameter of approximately 5½ inches. The 14 inch drum diameter and 5½ inch roll diameter have been preferable for most applications in the dairy industry. Length of the drum and press roll can vary with the quantity of materials being separated but will typically be approximately 24 inches.

Solids may be removed from the drum surface by a doctor blade 48. The doctor blade 48 is furnished on the housing 39 along the drum length. An edge of the doctor blade 48 is biased to engage and scrape against the entire length of the drum surface at a point approximately one inch downstream from the point of engagement between the drum and press roll 42.

The scraping edge of the doctor blade is intended to frictionally engage the drum to scrape or lift pressed solids from the drum surface. The doctor blade also directs the pressed, dry solids away from the housing to drop gravitationally to the ground surface or other appropriate collection device (not shown) below. The doctor blade can be yieldably urged toward tangential sliding contact with the drum surface by hold-down springs 49 mounted between the doctor blade and housing 39 as indicated in FIG. 4.

The press roll 42 is rotatably mounted to the housing 39 by bearing blocks 53 located at the roll ends. The bearing blocks 53 are slidably mounted within guides 54 furnished on the housing. The guides 54 are oriented substantially radially with respect to the drum 41 to facilitate radial motion of the press roll in relation to the drum.

The press roll 42 is urged along the guides 54 against the drum by biasing means generally indicated at 55. The biasing means may be comprised of a number of tension springs extending between the bearing blocks 53 and housing 39 to pull the roll 42 along the guides and against the drum 41. Appropriate adjustments can be provided along the tension springs to facilitate adjustment of tension and the resulting overall force with which the press roll tangentially engages the drum. It is preferred that the springs are adjusted to pull the press roll radially against the drum with the force of approximately 1200 pounds.

The housing is provided with a back wall or surface 56 that defines a boundary of the hopper 40, along with end walls of the housing and the press roll 42. A section of the drum surface, extending between an edge 57 of the back wall 56 and the point of tangential contact with the press roll 42, serves as the bottom of the hopper.

The back wall 56 forms an angle "X" with a plane containing the parallel axes of the drum 41 and press roll 42 (as graphically indicated in FIG. 4). The angle "X" is acute and is preferably approximately 32°. This angular orientation permits accumulation of materials within the hopper 40 so the material adjacent the open upward end of the hopper will exert its weight against the material engaging the roll and drum surfaces.

Another provision for encouraging reception and passage of materials between the rotating drum and press roll is the orientation of the separator 12 to the flume as indicated in FIG. 1. The separator is preferably suspended from the end of the flume such that the plane containing the rotational axes of the drum and press roll is at an angle Y within a range of 55° to 65° from the flume.

In this relationship between the flume 11 and separator 12, the housing wall 56 is oriented substantially vertically and the press roll is offset from the vertical as indicated in FIG. 4.

In operation, material dropped from the discharge end of the flume will be guided nearly vertically by the back wall 56 to the rotating surface of the drum where it is led to the press roll. The rotating drum 41 and roll 42 then compress the solids received between their converging surfaces and squeeze the contained liquids through the perforations of the drum. The liquid received is allowed to run through the perforations into the interior of the drum and consequently back through the perforations at the bottom extremities of the drum to drop into the drain tray 46. The dried material then continues on around the perforated drum surface to be removed by the doctor blade 48. The downwardly angled surface of the doctor blade directs the dried, pressed solids away from the drum to drop gravitationally therefrom.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A manure separator, comprising:

an elongated flume, inclined longitudinally between an upper end and a lower end and including a longitudinal descending infeed trough and a substantially parallel ascending discharge trough, the descending infeed trough extending downwardly from the upper end of the flume toward the lower end;

the ascending trough being openly joined to the descending infeed trough adjacent the flume lower end and extending upwardly to a discharge means at the flume upper end;

a perforated flume floor extending along the descending infeed trough and the ascending discharge trough to permit drainage of liquids from the descending and ascending troughs and to retain manure solids thereon;

paddle means movable in an endless circuit over the perforated flume floor including the descending infeed trough and the ascending discharge trough, for progressively moving manure solids and liquids downwardly along the descending infeed trough and upwardly along the ascending discharge trough such that said manure liquids and solids are separated by tumbling action along the perforated flume floor, and such that the manure solids remain on the perforated flume floor;

collector means below the flume floor for receiving liquids drained through the perforated flume floor; and a liquid discharge means at the lower flume end, openly connected to the collector means for receiving and discharging liquids received through the collector means.

2. A manure separator, comprising:

an elongated flume, inclined longitudinally between an upper end and a lower end and including a longitudinal descending infeed trough and an ascending discharge trough, the descending infeed trough extending downwardly from the upper end of the flume toward the lower end and the ascending trough being openly joined to the descending infeed trough adjacent the flume lower end and extending upwardly to a discharge means at the flume upper end;

a perforated flume floor extending along the descending infeed trough and the ascending discharge trough to permit drainage of liquids from the descending and ascending troughs and to retain manure solids thereon;

paddle means movable in a circuit including the descending infeed trough and the ascending discharge trough, for progressively moving manure solids and liquids downwardly along the descending infeed trough and upwardly along the ascending discharge trough such that said manure liquids and solids are separated by tumbling action along the perforated flume floor, and such that the manure solids remain on the perforated flume floor;

collector means below the flume floor for receiving liquids drained through the perforated flume floor;

a liquid discharge means at the lower flume end, openly connected to the collector means for receiving and discharging liquids received through the collector means; and press means adjacent the discharge means of the ascending discharge trough at the upper flume end, for receiving manure discharged therefrom and for compressing the received manure solids to separate moisture therefrom and for subsequently discharging the dried manure.

3. The manure separator as claimed by claim 2 further comprising:

a surge tray at the lower end of the flume communicating openly with the collector means and the liquid discharge means.

4. The manure separator as claimed by claim 3 wherein the flume is inclined upwardly from the lower end at an angle of at least 5°.

5. The manure separator as claimed by claim 2 wherein the flume is inclined upwardly from the lower end of the flume opposite the upper end at an angle of at least 5°.

6. The manure separator as claimed by claim 5 wherein approximately 35% of the flume floor is open by perforations.

7. The manure separator as claimed by claim 2 wherein approximately 35% of the flume floor is open by perforations.

8. The manure separator as claimed by claim 2 wherein the press means is comprised of:

a housing having a hopper with an open upper end thereof situated below the discharge of the ascending trough;

a rigid perforated drum mounted within the housing for rotation therein about a drum axis, wherein the drum forms a bottom surface of the hopper;

a press roll mounted to the housing for rotation thereon about a press roll axis parallel to the drum axis and situated in relation to the drum to define a side wall of the hopper;

wherein the press roll is biased toward tangential contact with the drum; and drive means for rotating the drum and press roll in opposite directions such that manure received within the hopper is carried from the hopper between the drum and press roll.

9. The manure separator as claimed by claim 8 wherein the drum is formed of perforated stainless steel and wherein the perforations thereof occupy approximately 32% of the drum surface.

10. The manure separator as claimed by claim 9 wherein the drum is cylindrical and includes a diameter of approximately 14 inches.

11. The manure separator as claimed by claim 8 wherein the drum and press roll are rotated in a range of 17 to 26 rpm and the paddle means is driven along the elongated flume at approximately 17 feet per minute.

12. The manure separator as claimed by claim 8 wherein the press roll includes a resilient surface having a durometer of approximately 45–50.

13. The manure separator as claimed by claim 8 wherein the press roll includes a diameter equaling approximately 40% of the drum diameter.

14. The manure separator as claimed by claim 8 wherein the press roll is mounted to the housing for radial movement thereon relative to the drum axis and further comprising biasing means interconnecting the press roll and housing for urging the press roll tangentially against the drum with a force of approximately 1200 lbs.

15. The manure separator of claim 14 wherein the press roll is movable along guide tracks formed in the housing, and wherein the tracks are angularly oriented at approximately 55° to 65° from the flume.

16. The manure separator of claim 8 wherein the hopper is situated to one side of the drum axis, including a hopper side wall opposite the press roll leading from the open end to the drum; and further comprising a doctor blade on the housing engaging the drum on a side thereof opposite the hopper and adjacent the press roll.

17. The manure separator of claim 2 wherein the press means is comprised of:
   a housing;
   a drum having a substantially rigid perforated drum surface mounted within the housing for rotation about a drum axis;
   a press roll having a resilient surface mounted within the housing for rotation about a roll axis substantially parallel to the drum axis;
   biasing means between the press roll and housing for yieldably urging the press roll radially toward the drum with respect to the drum axis such that the press roll makes tangential contact with the perforated drum surface; and
   drive means interconnecting the drum and press roll for driving the drum and press roll to rotate in opposite directions about their respective axes.

18. The manure separator of claim 17 wherein the perforations of the perforated drum surface occupy approximately 32% of the drum surface.

19. The manure separator of claim 17 wherein the drum and press roll are cylindrical and wherein the diameter of the press roll is approximately 40% of the diameter of the drum.

20. The manure separator of claim 17 wherein:
   the drum perforations occupy approximately 32% of the drum surface;
   the press roll diameter is approximately 5½ inches; and
   the drum diameter is approximately 14 inches.

21. The manure separator of claim 20 further comprising means for rotating the drum and press roll within a range of 17 to 26 revolutions per minute.

22. The manure separator of claim 20 further comprising means for rotating the drum and press roll at 18 revolutions per minute.

23. The manure separator of claim 14 further comprising means for rotating the drum and press roll within a range of 17 to 26 revolutions per minute.

24. The manure separator of claim 17 further comprising means for rotating the drum and press roll at 18 revolutions per minute.

25. The manure separator of claim 17 wherein the press roll includes a resilient surface formed of a material having a durometer value in the range of 45-50.

26. The manure separator of claim 17 wherein the biasing means comprises means for yieldably urging the press roll radially against the drum surface with a force equal to approximately 1200 lbs.

27. The manure separator of claim 17 further comprising:
   a doctor blade on the housing engaging the perforated drum surface along a side thereof.

28. The manure separator of claim 17 further comprising:
   a liquid receiving tray on the housing adjacent the drum and opposite the press roll.

29. The manure separator of claim 17 wherein the housing includes a back wall and where the drum and press roll axes lie within a plane forming an acute angle with the housing back wall.

30. The manure separator of claim 29 wherein the acute angle is approximately 32°.

* * * * *